United States Patent
Beguinot et al.

(10) Patent No.: US 9,103,008 B2
(45) Date of Patent: Aug. 11, 2015

(54) HIGH-CHARACTERISTIC STEEL FOR LARGE-SIZE PARTS

(75) Inventors: Jean Beguinot, Le Creusot (FR); Valery Ngomo, Le Creusot (FR)

(73) Assignee: INDUSTEEL CREUSOT, Saint-Denis (FR)

( * ) Notice: Subject to any disclaimer, the term of this patent is extended or adjusted under 35 U.S.C. 154(b) by 264 days.

(21) Appl. No.: 12/990,583

(22) PCT Filed: May 5, 2009

(86) PCT No.: PCT/FR2009/050822
§ 371 (c)(1), (2), (4) Date: Jan. 14, 2011

(87) PCT Pub. No.: WO2009/141556
PCT Pub. Date: Nov. 26, 2009

(65) Prior Publication Data
US 2011/0108169 A1 May 12, 2011

(30) Foreign Application Priority Data
May 6, 2008 (EP) .................................... 08300199

(51) Int. Cl.
| | |
|---|---|
| C22C 38/04 | (2006.01) |
| C22C 38/00 | (2006.01) |
| C22C 38/60 | (2006.01) |
| C22C 38/16 | (2006.01) |
| C22C 38/20 | (2006.01) |
| C22C 38/42 | (2006.01) |
| C22C 38/18 | (2006.01) |
| C22C 38/22 | (2006.01) |
| C22C 38/40 | (2006.01) |
| C22C 38/08 | (2006.01) |
| C22C 38/12 | (2006.01) |
| B29C 33/38 | (2006.01) |
| C22C 38/02 | (2006.01) |
| C22C 38/58 | (2006.01) |

(52) U.S. Cl.
CPC ................. *C22C 38/22* (2013.01); *B29C 33/38* (2013.01); *C22C 38/02* (2013.01); *C22C 38/58* (2013.01)

(58) Field of Classification Search
None
See application file for complete search history.

(56) References Cited

U.S. PATENT DOCUMENTS

| | | |
|---|---|---|
| 5,139,737 A | 8/1992 | Sudo et al. |
| 5,759,299 A | 6/1998 | Yokoyama et al. |

(Continued)

FOREIGN PATENT DOCUMENTS

| | | | | |
|---|---|---|---|---|
| CA | 1035602 | * | 8/1978 | .............. C22C 38/38 |
| DE | 651 845 C | | 10/1937 | |

(Continued)

OTHER PUBLICATIONS

British Standard EN 13674-1:2003 (2004).*

(Continued)

*Primary Examiner* — Yoshitoshi Takeuchi
(74) *Attorney, Agent, or Firm* — Sughrue Mion, PLLC; Richard C. Turner

(57) ABSTRACT

High-strength steel of which the chemical composition comprises, by weight:
$0.03\% \leq C < 0.2\%$
$Si \leq 0.49\%$
$3\% < Mn \leq 4\%$
$Ni \leq 0.9\%$
$1\% \leq Cr \leq 5\%$
$Mo+W/2 \leq 1\%$
$Cu \leq 0.9\%$
$S+Se/2+Te/3 < 0.020\%$
$Al \leq 0.1\%$,
the remainder being iron and impurities resulting from production. Block and plates obtained.

7 Claims, 1 Drawing Sheet

(56) References Cited

U.S. PATENT DOCUMENTS

| | | |
|---|---|---|
| 5,855,845 A | 1/1999 | Beguinot et al. |
| 2005/0115644 A1 | 6/2005 | Beguinot |

FOREIGN PATENT DOCUMENTS

| | | | | |
|---|---|---|---|---|
| EP | 0 882 808 A1 | | 12/1998 | |
| FR | 2 241 624 A | | 3/1975 | |
| JP | 06-184695 | * | 7/1994 | ............ C22C 38/00 |
| JP | 6-184695 A | | 7/1994 | |
| JP | 11-152520 | * | 6/1999 | ............ C21D 9/04 |
| JP | 2001-294973 A | | 10/2001 | |

OTHER PUBLICATIONS

English translation of Ueda et al (JP 11-152520).*
English translation of Hama et al (JP 06-184695).*
English translation of Ueda et al (JP 11-152520) (1999).*
English translation of Hama et al (JP 06-184695) (1994).*

* cited by examiner

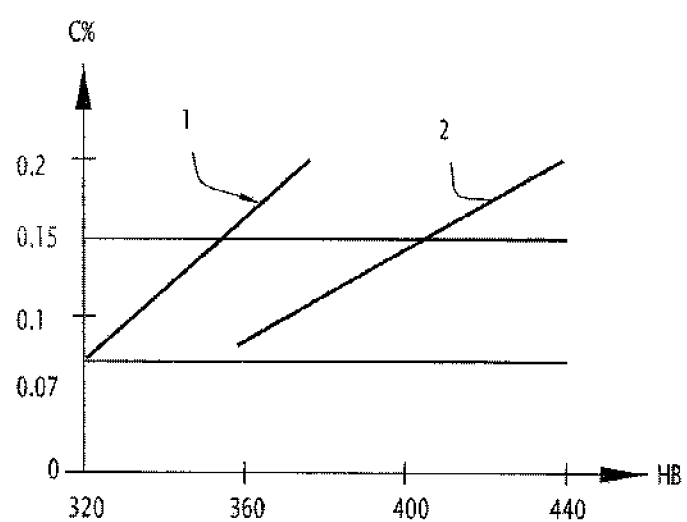

HIGH-CHARACTERISTIC STEEL FOR LARGE-SIZE PARTS

CROSS REFERENCE TO RELATED APPLICATIONS

This application is a National Stage of International Application No. PCT/FR2009/050822, filed on May 5, 2009, which claims priority from European Patent Application No. 08300199.0, filed on May 6, 2008, the contents of all of which are incorporated herein by reference in their entirety.

The present invention relates to a high-strength steel intended, in particular, for the manufacture of large-size parts such as parts of moulds for plastics materials, tooling parts such as dies, or wear parts such as abrasion-resistant parts.

For numerous applications, the mechanical parts which are subjected to high stresses or to very high wearing loads have to be produced from steels having high mechanical strengths corresponding to hardnesses of between 300 and 500 HB, but which must nevertheless remain sufficiently tough, machinable, weldable, etc. These parts are generally obtained by cutting and machining plates or blocks of great thickness. A block having a generally parallelepipedal shape is obtained by forging an ingot. A plate is obtained by rolling an ingot or a slab.

For these articles of generally parallelepipedal shape, the thickness is the smallest dimension. For the blocks or plates in question here the thickness is greater than 10 mm and can be as great as 1 meter.

The existence of hard points is often observed on blocks or plates of this type consisting of the aforementioned steels, owing to segregation. This segregation corresponds to local variations in chemical composition resulting from solidification phenomena of the ingots from which the blocks are produced. These hard points have several drawbacks. They may have the effect of making uniform machining or polishing difficult, and this may pose problems in the production of parts for which geometric precision and surface quality are important. These variations in hardness may also have the effect of creating brittle regions which may be preferential sites for the initiation of cracks that are detrimental, in particular, to the overall toughness of the parts, but also to the weldability or suitability for thermal cutting of the parts.

The greater the section of the parts in question, the more pronounced these segregation problems are. This is the case, in particular, with parts having sections which may be as much as several decimeters or even more than 1 meter, in particular owing to the need to add a large quantity of alloying elements in order to obtain sufficient quenchability to permit the production of such parts.

To reduce the size of these segregated regions, ingot manufacturing methods of the electroslag remelting (ESR) or vacuum remelting type are sometimes employed. These methods are particularly effective for obtaining very homogeneous large-size parts which consequently have satisfactory properties in service. However, they have the drawback of being extremely expensive. Therefore, these methods are basically used for very high performance parts which, in view of their uses, can justify very high manufacturing costs.

To reduce the effect of this segregation, the use of homogenizing heat treatments has also been proposed. The object of these heat treatments is to reduce the local variations in chemical composition by diffusing the chemical elements from the regions with the highest content to the regions with the lowest content. They have the drawback of being extremely lengthy and therefore of being extremely expensive.

It is an object of the present invention to overcome these drawbacks by providing a steel for obtaining high mechanical characteristics which may be as high as 400 HB, or even 450 HB, even in the core of very bulky parts, while having relatively slight variations in hardness due to segregation.

The invention accordingly relates to a high-strength steel of which the chemical composition comprises, by weight:

0.03%≤C<0.2%
Si≤0.49%
3%<Mn≤4%
Ni≤0.9%
1%≤Cr≤5%
Mo+W/2≤1%
Cu≤0.9%
S+Se/2+Te/3<0.020%
Al≤0.1%, the remainder being iron and impurities resulting from production.

Preferably, the chemical composition satisfies one or more of the following conditions:

Cr>2.5%
Cr<3.5%
Ni<0.5%
Cu<0.4%
Mo+W/2≤0.3%.

In particular, in a preferred embodiment, the chemical composition is such that:

2.7%≤Cr≤3%
Mo≤0.3%.

The invention also relates to a steel block or plate according to the invention having a thickness greater than 20 mm and a bainitic, martensito-bainitic or martensitic structure and of which the difference in hardness between the harder regions and the less hard regions of the block or plate, resulting from the segregated veins, is less than approximately 20% of the average hardness of the block.

The invention finally relates to a method for manufacturing a steel block or plate according to the invention whereby, after shaping by hot plastic deformation by forging or rolling, quenching is carried out by air cooling or austenitization is carried out and is followed by quenching by air cooling.

The invention is particularly suitable for the manufacture of plates or blocks having a thickness greater than 20 mm. This thickness can exceed 100 mm and even exceed 150 mm, even 300 mm, and even 500 mm. It may be as great as 1 meter.

BRIEF DESCRIPTION OF THE DRAWING

The FIGURE shows the development of the hardness as a function of the carbon content for blocks of steel of which the composition comprises 0.15% of silicon, 3.3% of manganese, 3% of chromium and 0.25% of molybdenum, wherein the blocks have been air cooled after normalizing to 900° C. subsequent to prior hot rolling.

The first block was tempered at 480° C. and the second at 550° C. The block which was tempered at the temperature of 480° C. has a hardness of 360 HB with a carbon content of 0.1% whereas the same steel tempered at 550° C. has a hardness of only 320 HB. Similarly, when the steel contains approximately 0.2% of carbon, the block tempered at 480° C. has a hardness of approximately 440 HB whereas the block tempered at 560° C. has a hardness of 375 HB. The minimum carbon content of 0.03% corresponds to a value below which the hardening segregation and the benefit attached to the reduction thereof become slight.

The invention will now be described in a more detailed, but non-limiting, manner with reference to the single appended FIGURE and will be illustrated by examples.

The appended FIGURE is a graph showing the desired carbon content as a function of the desired hardness of a high-characteristic steel according to the invention, after tempering at 550° C. (line 1) or after tempering below 500° C. (line 2), for a basic composition: 0.15% of silicon, 3.3% of manganese, 3% of chromium, 0.25% of molybdenum and for blocks which have been air-cooled after normalizing at 900° C.

In order to produce parts having very great thicknesses, the thickness being greater than 20 mm and possibly being as great as 500 mm or even exceeding 1 meter, and in order that the average hardness is extremely homogeneous between the core and the surface, it is necessary to use a steel of which the quenchability is sufficient to obtain a homogeneous structure without the need to carry out quenching in an excessively harsh quenching medium. The harsher the quenching medium, the greater the variations in the cooling rates within the block and therefore the greater the risks of obtaining a heterogeneous structure. However, when quenchability is adequate air cooling and, in particular, still air cooling, which leads to relatively modest differences in cooling between the surface and the core leads to a satisfactory structure which is therefore extremely homogeneous. These quenching conditions obviously do not have a direct influence on the problem of local variations in hardness resulting from segregation.

In order to achieve adequate quenchability, it is generally considered necessary to use chemical compositions having a high content of alloying elements. However, these alloying elements have the effect of inducing segregation which may be significant.

Although it is generally considered that the greater the tendency of the alloying elements to segregate, the greater their influence on the difference in hardness of the segregated veins is, the inventors have found, in a completely novel and unexpected manner, that there was no correlation between the intensity of the overhardening into the segregated vein in alloying elements and the respective propensities of each of these alloying elements to segregate.

The propensity of the alloying elements to segregate and their effects on the hardnesses of the segregated veins is illustrated by the following tests, during which steel was cast in six batches into ingots of 3 tonnes having the compositions, expressed as $10^{-3}$% by weight, shown in Table 1.

TABLE 1

|   | C | Si | Mn | Cr | Mo | Ni |
|---|---|----|----|----|----|----|
| 1 | 170 | 200 | 1500 | 2800 | 100 | 1500 |
| 2 | 170 | 500 | 1500 | 2800 | 100 | 1500 |
| 3 | 170 | 200 | 2800 | 2800 | 100 | 1500 |
| 4 | 170 | 200 | 1500 | 1300 | 100 | 1500 |
| 5 | 170 | 200 | 1500 | 2800 | 400 | 1500 |
| 6 | 170 | 200 | 1500 | 2800 | 100 | 200 |

These ingots were rolled into 50 mm thick plates which were cut up into samples of which both the average hardness and the hardenings due to segregation were measured. The samples taken from each of the plates were examined on the one hand in the as-cooled state in which they had a martensitic structure and on the other hand in the state in which they had been tempered at a temperature of 500° C. at which they had a tempered martensitic structure.

The following was measured concurrently in the segregated veins of each of the samples:

the average degrees of segregation of each of the different alloys (Si, Mn, Cr, Mo, Ni), by means of microprobe determination. The tendency to segregate inherent in each element was characterized by means of the ratio (%) relating to the difference between average segregated vein composition Cv and composition during casting C0 to the value of the latter (namely: (Cv−C0)/C0);

the average hardness of the segregated veins, by means of conventional Vickers type tests under 300 g. The overhardening into veins corresponds to the difference between the average hardness of the veins and that of the surrounding matrix outside the veins. By subsequently comparing these measurements between pairs of castings it is possible to deduce the contribution to the overhardening into veins attributable specifically to the segregation of each alloying element.

The proportion of overhardening into veins attributable to an element is the resultant of the segregation of this element, in other words, by definition, the product of the nominal content of this element times its degree of segregation. Consequently, the elements will be validly compared with regard to their harmfulness in this regard by relating in each case the contribution to the overhardening to the same reference level of nominal content (0.2% was selected arbitrarily).

Thus, by way of example, the difference in average hardness of 33 HV found between castings 1 and 3 (with 1.5% and 2.8% of Mn) leads to evaluation of an overhardening of 33× (0.2%/1.3%)=5 Hv for 0.2% of Mn (cf. table below).

The results are shown in Table 2 below.

TABLE 2

| Alloying elements | Inherent tendency of the element to segregate | Overhardening effect (Hv) found in segregated veins related to 0.2% of alloy (after tempering) |
|---|---|---|
| Si | 35% | 8 |
| Cr | 26% | 17 |
| Mn | 42% | 5 |
| Mo | 67% | 70 |
| Ni | 32% | 3 |

Expressed in qualitative terms, the inherent tendency of each element to segregate and its effect of hardening into segregated vein are set out in Table 3 below.

TABLE 3

| Alloying element | Inherent tendency of the element to segregate | Overhardening effects (Hv) found in segregated veins |
|---|---|---|
| Si | Medium | Slight |
| Cr | Slight | Medium |
| Mn | Fairly strong | Very slight |
| Mo, V | Strong | Very strong |
| Ni | Medium | Very slight |

In view of these results, it appears that, contrary to generally accepted ideas, in order to achieve very good quenchability with slight segregation, it is desirable to select a composition comprising a large amount of manganese, little chromium and little molybdenum. It may also be beneficial to provide a large amount of nickel. As nickel is a very expensive element, however, it is preferable to use manganese rather than nickel.

These results show that, to produce steels for the manufacture of very large size parts having high characteristics and having relatively slight variations in hardness due to segregation, it is desirable to use a steel of which the composition satisfies the following conditions:

carbon: from 0.03% to 0.2% as a % by weight. This element has the main effect of acting on the hardness of the martensite, its content therefore being selected as a function of the degree of hardness desired in the parts. To determine the carbon content as a function of the desired hardness, the scale of hardness can for example be divided into tranches of 40 HB, between 320 HB and 440 HB. These ranges correspond approximately to conventional ranges of use of abrasion-resistant steels or tooling steels.

The following ranges of carbon content can also be considered: from 0.03% to 0.06% of carbon, from 0.07% to 0.15%, and from 0.16% to 0.20% of carbon. A range of hardness corresponds to each of these ranges of carbon content, for a given heat treatment. Depending on whether the steel has been tempered at about 550° C. or has not been tempered or has only received a treatment at a temperature of substantially less than 500° C., the degree of hardness for an identical carbon content is not the same. In general, the lowest range of hardness corresponds to the lowest carbon content and the highest range of hardness to the highest carbon content. However, the boundaries of these ranges of carbon content corresponding to the hardnesses vary slightly as a function of the contents in the other alloying elements and as a function of the cooling rate and also as a function of the heat treatment carried out on the parts.

This segmentation is illustrated by an example of steel of which the composition comprises 0.15% of silicon, 3.3% of manganese, 3% of chromium and 0.25% of molybdenum in addition to the carbon. FIG. 1 shows the development of the hardness as a function of the carbon content for blocks which have been air cooled after normalizing to 900° C. subsequent to prior hot rolling. The first block was tempered at 480° C. and the second at 550° C. As shown in the drawing, the block which was tempered at the temperature of 480° C. has a hardness of 360 HB with a carbon content of 0.1% whereas the same steel tempered at 550° C. has a hardness of only 320 HB. Similarly, when the steel contains approximately 0.2% of carbon, the block tempered at 480° C. has a hardness of approximately 440 HB whereas the block tempered at 560° C. has a hardness of 375 HB. The minimum carbon content of 0.03% corresponds to a value below which the hardening segregation and the benefit attached to the reduction thereof become slight. It will be noted that the hardnesses obtained vary slightly by application of tempering once its temperature no longer exceeds substantially 480° C. These results are also applicable to plates.

silicon: This element which is used, in particular, to deoxidize the bath of liquid steel during production has a content which is generally greater than 0.025% and preferably greater than 0.05% or even possibly exceeds 0.1%. However, the content of this element must remain less than 0.49%, preferably less than 0.35% and more preferably less than 0.19% and, if possible in view of the deoxidation requirements of the bath, must remain less than 0.1%. Silicon is an element which tends to very significantly increase the large-scale segregation at the ingot head (known as major segregation), and this then has the effect of feeding the segregated veins which are therefore greater, the greater the segregation at the ingot head. In addition, the silicon tends to impair the thermal conductivity of the steel, and this may be unfavourable in some applications such as, in particular, moulds for the moulding of plastics material. Finally, silicon is detrimental to the sensitivity to brittleness of reversible tempering, which should be taken into consideration, in particular when the cooling rates of the products are low, which is the case in the applications in question for this steel.

chromium: This element has a favourable effect on the quenchability and, owing to its tendency to form carbides, has a favourable effect on the resistance to softening during tempering, and the effect of overhardening on the segregated veins is much less pronounced than that of molybdenum or tungsten. It must be added in contents which are preferably greater than 1% and more preferably greater than 2.5%, but which must remain less than 5% and preferably less than 3.5% and even more preferably be between 2.7% and 3% in order to obtain both adequate quenchability and satisfactory resistance to tempering softening, without leading to excessive overhardening of the segregated regions at the same time.

molybdenum and tungsten: These two elements, which have a very pronounced tendency to form carbides which promote high resistance to softening during tempering, do however have the drawback of having a very significant effect on the overhardening of the segregated regions. Therefore, as tungsten has the same effect as molybdenum in a proportion of 2% of tungsten per 1% of molybdenum, the sum Mo+W/2 will be limited to 1%, preferably 0.5% and even 0.3% maximum.

vanadium, niobium: As these elements have extremely undesirable effects on the overhardness of the segregated regions, the steel will not receive voluntary additions of vanadium or niobium which could however exist in the state of residuals, the vanadium content having to remain less than 0.010% and preferably less than 0.005%, and the niobium content having to remain less than 0.050% and preferably less than 0.010%.

manganese: This element has a very favourable effect on the quenchability and also has the advantage of having a very modest effect on the overhardness of the segregated regions. It is therefore preferably used for achieving quenchability. Therefore, the manganese content is between 3% and 4% so that the combined effect of the manganese and the carbon on the quenchability is adequate.

nickel: This element has a favourable effect on the quenchability and a modest effect on the overhardness of the segregated regions. However, this element is very expensive so its content is less than 0.9%, preferably less than 0.5% and even more preferably is merely at residual levels.

copper: The content of this element which is often present in the form of a residual must remain less than 0.9%, preferably less than 0.4% and more preferably even lower at less than 0.2%, since this element does not have a particularly favourable effect on the properties of the steel in question.

aluminium: This element which has a favourable effect on the deoxidation of the liquid steel bath during production and, in the solid state, enables the austenitic grain size to be controlled by aluminium nitride formation has a content of less than 0.1%. When the sulfides possibly formed, which can form elongate networks which are the source of surface disintegration, are intended to be globulized, it is preferable to add from 0.040 to 0.60% of aluminium.

sulfur, Se, Te: Sulfur, which is an impurity that is always present at least at trace levels, can have a favourable effect on machinability. If the contents are excessive, however, it has an unfavourable effect on the toughness and possibly on the polishability of the steels. Selenium and tellurium have effects comparable to that of sulfur in a proportion of 2 parts of selenium per 1 part of sulfur or of 3 parts of tellurium per 1 part of sulfur. Therefore, especially in applications requiring good polishability, the sum S+Se/2+Te/3 is in the state of a trace level or greater than 0.005%, but remains less than 0.020% in any case.

The remainder of the composition comprises iron and impurities resulting from production.

To manufacture parts comprising the steel which has just been described, a steel with the selected composition is first produced, then this steel is cast in the form of a semi-finished product, for example, an ingot, which is shaped by hot plastic deformation, either by forging or by rolling.

The blank thus obtained, which forms a block of steel or a plate, is then used either in the as-rolled or as-forged state or after a heat treatment appropriate for the envisaged use selected by the person skilled in the art.

The as-rolled or as-forged state is employed in particular for applications such as the manufacture of parts intended to resist wear in the mineral industry or civil engineering, in which applications the cost of the steel is a very important element of the selection.

When more specific properties are desired, the optionally cut or pre-machined as-forged or as-rolled parts, plates or blocks are austenitized by heating to a temperature greater than the temperature $AC_3$, in general of about 900° C., and are then quenched by cooling in the open air, in particular in still air, or optionally in a quenching medium giving a slightly faster cooling, but without this being desired. This austenitization followed by air cooling has the advantage of enhancing the ratio of the elastic limit to the tensile strength.

It will be noted that the quenching treatment can, if necessary, be carried out directly in the heat of shaping by hot plastic deformation, if this has been carried out under appropriate temperature conditions. The person skilled in the art knows how to determine such conditions.

The blocks or plates, whether in the hot-shaped state or reaustenitized and slowly cooled, can advantageously be subjected to a tempering heat treatment at a temperature greater than 450° C. but of less than 550° C. A tempering treatment of this type, which does not significantly change the hardness, has the advantage of reducing the residual stress level in the tanks or the parts in the state as they leave the preceding treatments.

This reduction in internal stresses is particularly advantageous for precision parts obtained after very significant machining by removal of material. From this point of view, the reaustenitization and slow cooling treatment has the advantage over the crude hot shaping state of relaxing at least some of the residual stresses.

Finally, the tempering treatment may have the advantage of further enhancing the ratio of the elastic limit to the tensile strength slightly.

In a variation, the tempering treatment may be replaced by a stress-relieving treatment at a temperature of between 150° C. and 250° C.

A stress-relieving treatment of this type does not lead to appreciable variations in hardness. On the other hand, it generally leads to a significant improvement in toughness, and this is useful both for facilitating use of the products and for improving the service life of the parts.

A treatment of this type is particularly appropriate for parts intended to work under conditions necessitating high resistance to wear due to metal-on-metal friction as encountered in mechanical engineering, or wear due to abrasion encountered in civil engineering, mines or quarries.

By way of example, two castings of steel designated 1 and 2 were carried out and were compared with steels designated C1 and C2, given by way of comparison.

With these steels having the compositions given in Table 4, 150 mm thick plates were manufactured by hot rolling and, after cooling, were reaustenitized by heating to 900° C., and were then air cooled.

TABLE 4

|  | C | Si | Mn | Ni | Cr | Mo | V | H | dH | dH/H (%) | Tf | Weldability | Econom |
|---|---|---|---|---|---|---|---|---|---|---|---|---|---|
| C1 | 0.24 | 0.2 | 1.3 | 0.3 | 1.9 | 0.49 | — | 310 | 65 | 21 | 150 | + | ++ |
| C2 | 0.53 | 0.4 | 0.8 | 1.6 | 1.1 | 0.55 | 0.11 | 395 | 119 | 30 | 41 | + | + |
| Steel inv 1 tem 550° C. | 0.11 | 0.10 | 3.4 | 0.2 | 2.9 | 0.28 | — | 340 | 41 | 12 | 135 | +++ | +++ |
| Steel inv 2 tem 480° C. | 0.13 | 0.15 | 3.2 | 0.2 | 3.0 | 0.22 | — | 405 | 48 | 15 | 105 | ++ | +++ |

The average Brinell hardness (H), the difference (dH) in hardness between the hardest portions of the segregated regions and the least hard portions of the plates, and the ratio between the hardness difference and the average density (dH/H in %), were measured on the plates obtained, the machinability was evaluated by a milling time (Tf) and the weldability and the economic value of the steel were also evaluated.

The results which are also shown in Table 4 demonstrate that the steels according to the invention, while having hardnesses which may be relatively great as they range between 340 HB and 405 HB, have hardness variations which represent less than 15% of the average hardness as against more than 20% for steels according to the prior art. In addition, these steels have satisfactory machinability, are more suited to welding than the comparison steels and are more economical.

The invention claimed is:

1. Steel block or plate having a thickness greater than or equal to 20 mm and less than or equal to 1 m, and a composition-comprising, by weight:

0.03%≤C≤0.15%
Si≤0.49%
3.2%≤Mn≤4%
Ni≤0.9%
1%≤Cr≤5%
Mo+W/2≤1%
Cu≤0.9%
S+Se/2+Te/3<0.020%
Al≤0.1%, the remainder being iron and impurities resulting from production;

wherein the steel block or plate has a structure consisting of bainite and martensite, and in that the difference in Brinell hardness between the harder regions and the less hard regions of the steel block or plate, resulting from segregated veins, is less than 20% of the average Brinell hardness of the steel block or plate.

2. Steel block or plate according to claim 1, wherein the chemical composition is such that: Cr>2.5%.

3. Steel block or plate according to claim 1, wherein Cr<0.5%.

4. Steel block or plate according to claim 1, wherein Ni<0.5%.

5. Steel block or plate according to claim 1, wherein Cu<0.4%.

6. Steel block or plate according to claim 1, wherein Mo+W/2≤0.3%.

7. Steel block or plate according to claim 1, wherein the chemical composition is such that: 2.7%≤Cr≤3% and Mo≤0.3%.

* * * * *